United States Patent [19]

Jackson et al.

[11] Patent Number: 4,669,212
[45] Date of Patent: Jun. 2, 1987

[54] GUN BARREL FOR USE AT HIGH TEMPERATURE

[75] Inventors: Melvin R. Jackson; Paul A. Siemers, both of Schenectady, N.Y.; David P. Perrin, Charlotte, Vt.

[73] Assignee: General Electric Company, Schenectady, N.Y.

[21] Appl. No.: 665,864

[22] Filed: Oct. 29, 1984

[51] Int. Cl.⁴ .................. F41C 21/02; F41F 17/04; F41F 17/08
[52] U.S. Cl. .................. 42/76.02; 89/16; 29/1.11; 427/34
[58] Field of Search .......... 42/76 A; 89/16; 420/460; 29/1.11; 527.2; 419/5, 8, 38; 427/34, 423

[56] References Cited

U.S. PATENT DOCUMENTS

| | | | |
|---|---|---|---|
| 2,542,962 | 2/1951 | Kinsey | 420/460 |
| 2,780,019 | 2/1957 | Sullivan | 42/76 A |
| 2,935,912 | 5/1960 | Hartley | 42/76 A |
| 3,261,121 | 7/1966 | Eves | 42/76 A |
| 3,442,172 | 5/1969 | Wehrmann et al. | 89/16 |
| 3,617,397 | 11/1971 | Maxwell | 420/460 |
| 3,933,483 | 1/1976 | Komatsu et al. | 420/460 |
| 3,975,219 | 8/1976 | Allen et al. | 148/428 |
| 4,012,241 | 3/1977 | Lemkey | 148/428 |
| 4,111,723 | 9/1978 | Lemkey | 148/428 |
| 4,370,789 | 2/1983 | Schilke et al. | 427/34 |
| 4,379,720 | 4/1983 | Ray et al. | 420/460 |
| 4,409,881 | 10/1983 | van der Wielen | 89/16 |
| 4,537,742 | 8/1985 | Siemers et al. | 427/34 |

FOREIGN PATENT DOCUMENTS 4575979 4/1979 Australia .

OTHER PUBLICATIONS

"Evaluation of Directionally Solidified Eutectic Superalloys for Turbine Blade Applications", NASA Contract Rept. #NASA CR 135151, Apr. 1978.

"Evaluation of an Advanced Directionally Solidified γ/γ-α Mo Eutectic Alloy", NASA Contract Rept. #NASA CR 159416, Jan. 1979.

*Primary Examiner*—Deborah L. Kyle
*Assistant Examiner*—Ted L. Parr
*Attorney, Agent, or Firm*—Paul E. Rochford; James C. Davis, Jr.; Paul R. Webb, II

[57] ABSTRACT

The present invention provides a gun capable of operating at relatively higher temperatures. The barrel of the gun is made up of at least two layers. The inner layer is of a refractory material which may be a metal refractory or a non-metal refractory. The liner is bonded to an outer jacket material formed of an alloy of nickel, aluminum and molybdenum. The coefficient of expansion of the liner and of the jacket are relatively low so that the gun does not expand extensively when heated by intensive use. The jacket metal is of higher strength at elevated temperature than is the conventional gun barrel steel.

14 Claims, 7 Drawing Figures

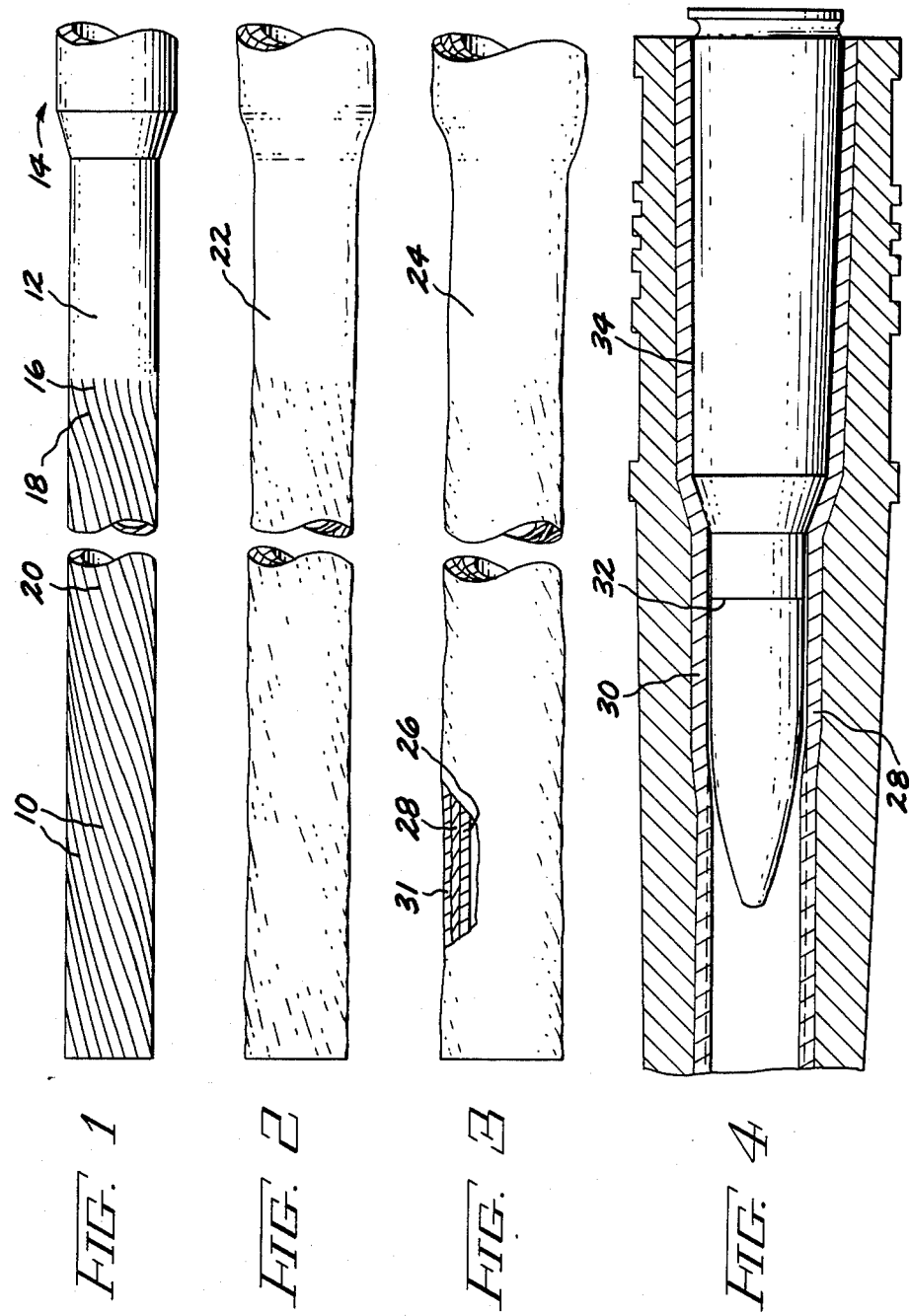

YIELD STRENGTH

THERMAL EXPANSION

GUN BARREL FOR USE AT HIGH TEMPERATURE

BACKGROUND OF THE INVENTION

The subject invention relates to a gun barrel particularly suited for use at elevated temperatures and to the method of making such gun barrels.

It is known that gun barrels become heated during prolonged use. As use at higher and higher temperatures occurs the steels from which gun barrels are conventionally made will suffer substantial reductions in strength and further will be less dimensionally accurate due to greater thermal expansion.

Gun barrels may become heated through a number of mechanisms. One such mechanism is the prolonged use of the gun over extended periods at significant firing rates.

A gun barrel can also become heated in relatively shorter time when used to fire projectiles at more rapid rates.

Gun barrels also become heated where the energy employed in firing a projectile is increased as in developing higher muzzle velocity of a projectile. Where larger amounts of propellant, or where propellant which yields higher energy on burning, are employed this also can lead to more rapid heating of the gun barrel from which the projectiles are delivered.

The rapid heating of a barrel during rapid fire of projectiles for extended times can occur although the propellant energy is relatively low. This heating is due in part to the heat of friction generated as the numerous projectiles are accelerated along the barrel and in a rapid fire sequence.

The mode of failure of structures designed for specific end uses such as gun barrels can be determined by basic mechanisms. One such mechanism is the rate at which heat can be transferred from the internal structure, which receives the heat, through the wall structure and to an outer surface which can dispel the heat. For example, in a gun barrel the heat is received by the barrel at the barrel interior due to the burning and heat of burning of the propellant material. In addition, frictional force of the projectile moving along and against the surface of the interior of the barrel can generate heat at the immediate surface contacted by the projectile. Where the amount of heat which can be removed from the barrel through normal conduction mechanism is limited this places a limit also on the application which can be made of the gun. If barrel temperatures become excessive, the gun may fail. This may occur either locally at the inner surface of the gun barrel by localized melting or metal deformation at high temperature, or throughout the barrel as the physical properties of the overall structure of the barrel deteriorates. Such deterioration can result in a rupture of the barrel.

Another mode of failure of a barrel can be mechanical in nature. Such mode can result from a simple mechanical failure to contain the mechanical forces which are applied on the gun barrel. For example, as a propellant is ignited and burns it generates not only heat but also very high pressure and this pressure must be mechanically contained by the barrel. Also, where the projectile leaves its cartridge and starts down the barrel the rifling on the barrel mechanically applies a torsional force to the projectile to give it spin necessary to aid it in its accurate flight to a destination or target. Where the mechanical force needed to initiate rotation of the projectile is excessive, mechanical failure of the barrel can occur at the location adjacent to the chamber where the barrel rifling starts.

Regarding the heat generated at the bore of a gun barrel this heat can build up very rapidly in spite of the fact that the heat can be transferred through the wall of the barrel to the barrel exterior because of the higher rate at which heat can be produced at the bore compared to the rate at which the produced heat can be carried by heat conduction through the thickness of the barrel wall. For a barrel wall of lower conductivity, when long bursts of firing occur, or when the heat produced by the gases is relatively high, this heat production is concentrated at the bore surface and may not be conducted from the bore rapidly enough because of the limitations in the conductivity of heat through the material of the barrel wall.

There is a heat sink effect in the thickness of the barrel but this heat sink is available only until the temperature of the barrel itself is raised by production of heat within the bore which is in excess of the quantity of heat which can be conducted through the wall thickness based on the characteristics of the material of the wall itself.

In fact the combined barrel and propellant must be treated as a system because all the elements of the gun must be kept in balance. Any one element which is out of balance with the others can cause failure. For example, if the propellant generates excessive pressure or temperature or is used in excessive amount, this alone could disrupt the balance between the several components of the system and lead to excessive heat and thermal degradation of the barrel or bore surface.

It is recognized in the industry that if guns are designed to fire projectiles at significantly higher velocity and at higher energy, better gun barrels will be needed.

To accommodate such higher temperatures generated in the barrels of guns it is theoretically possible to form the barrels of metals which withstand higher temperatures than the low alloy carbon steels conventionally used in forming gun barrels.

Commercially available metal alloys for high temperature applications providing high strength consist of nickel or cobalt-base alloys or refractory metals and their alloys. The commercially available nickel and cobalt alloys generally have greater thermal expansion coefficients than do steels. For this reason they are largely unsuitable for barrel jacket materials if a material having a combination of low thermal expansion and high strength at high temperatures is sought as is the case in the subject invention.

Some iron-nickel alloys such as Invar or IN-907, are alloyed to take advantage of certain magnetic interactions that lead to low expansion behavior over a range of temperatures generally below 500° C. However, these alloys are typically weak compared to steels and have quite low elastic moduli in the temperature range of low expansivity.

The refractory metals and particularly tungsten, tantalum and molybdenum meet the criteria of low expansivity at high temperature, and of retaining high strength but their cost and high density ranging from 10 to 19 grams per cubic centimeter are excessive for practical considerations.

Presently prior art gun barrels are made of low alloy carbon steels. Some gun barrels are made with chromium liners which are electroplated on the inside diameter of the low alloy carbon steels normally used as the jacketing material of current gun barrels. Such chromium lined barrels are adequate for a lower range of projectile firing rates and a lower level of propellant energies. However, as the firing rates and propellant energies are increased as discussed above the basic low alloy carbon steel barrels will prove progressively inadequate.

It is projected that if suitable barrels were available, up to three times as much propellant energy will be employed as compared to current usage to achieve the designed projectile firing rates and muzzle velocities. Since present low alloy carbon steel barrels, and even such barrels lined with chromium, may show failure due to localized melting, the increased energy released in the barrels and applied to the bore of the barrels makes the chromium lined low alloy carbon steels inadequate for the higher firing rates and higher propellant energies to be used.

As indicated above the higher operating temperatures contemplated for proposed gun designs will put severe demands on the gun system. Whole barrel temperatures may be expected to be in the 750° to 950° C. temperature range. High strength of the jacket material at high temperature is essential. Greater thermal fatigue resistance is needed due to increased thermal excursions that the guns will experience. To maintain barrel stability the elastic modulus of the jacket at elevated temperatures will need to be greater than that of the present low carbon steels.

The expansion of barrel dimensions due to thermal excursions in present and prior art alloys prevents long burst firing because as the bore of the gun expands the projectile does not interact desirably with the rifling in the bore and does not attain the proper spin or trajectory. Trajectile accuracy for barrels operating with higher projectile firing rates and at higher propellant energies will be an important criterion nevertheless.

One gun barrel for use at higher operating temperatures and a process for its manufacture is disclosed in U.S. Pat. No. 4,409,881 issued Oct. 18, 1983.

BRIEF DESCRIPTION OF THE INVENTION

Accordingly one object of the present invention is to provide a gun having a barrel which is not susceptible to loss of strength and other important properties due to heating.

Another object is to provide a barrel which retains most of its good physical properties at elevated temperatures.

Another object is to provide a gun which is capable of sustained rapid fire.

Another object is to provide a gun barrel capable of operation at higher temperatures at a relatively low cost.

Another object is to provide a gun which can deliver projectiles at relatively higher firing levels over extended periods of time.

Other objects will be in part apparent and in part pointed out in the description which follows.

In one of its broader aspects the object of the present invention can be achieved by providing a gun having a barrel with a refractory liner to provide an abrasion resistant surface at the bore of the gun and by providing a jacket formed of an alloy of nickel, aluminum and molybdenum of lower coefficient of thermal expansion and capable of withstanding relatively high temperatures without loss of properties such as strength and dimensional stability.

BRIEF DESCRIPTION OF THE DRAWINGS

The invention and the manner of carrying it into effect will be better understood from the description which follows by reference to the accompanying drawings in which:

FIG. 1 is a longitudinal elevation of one form of a mandrel for a gun barrel as provided pursuant to this invention.

FIG. 2 is a longitudinal elevation of a liner as formed on a mandrel as illustrated in FIG. 1.

FIG. 3 is a longitudinal elevation, in part in section, of a mandrel with an overlaying liner and with an overlaying intermediate layer as provided pursuant to the present invention.

FIG. 4 is a longitudinal sectional view of a gun barrel as formed with a cartridge in place in the gun chamber.

DETAILED DESCRIPTION OF THE INVENTION

Figure 5:
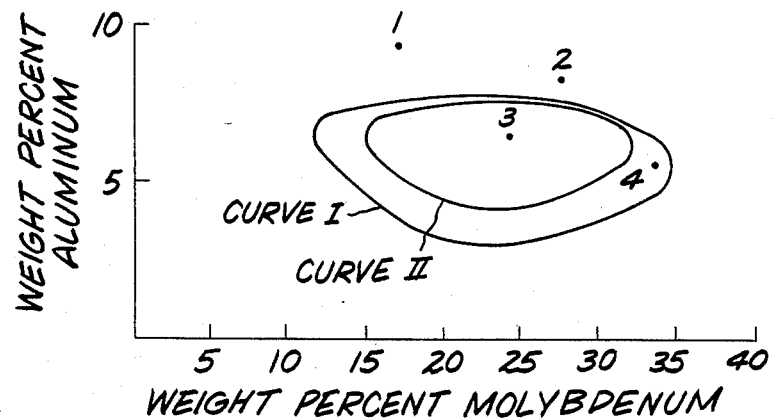
FIG. 5 is a plot in weight percent of the aluminum and molybdenum in nickel useful as a barrel metal of the article of the present invention.

The gun barrel of the subject invention is formed to permit operation at elevated temperatures in the range of approximately 750° to 950° C. The barrel of the gun is formed with a combination of materials which cooperate in that they each have high elastic modulus and low thermal expansion.

A liner for a gun is formed as described in the commonly owned U.S. Pat. No. 4,577,431. The content of this patent is accordingly incorporated herein by reference.

An important process employed in forming elements of the gun barrel of the present invention is use of the low pressure plasma deposition technique.

A liner for a gun may accordingly be formed of a refractory material such as refractory metal or it may be formed of a refractory compound such as tungsten carbide, tantalum carbide or the like.

An intermediate layer may be formed between the refractory liner layer and the outer jacket of the barrel. A novel feature of the gun barrel of this invention is the combination of an inner liner of low coefficient of expansion with a jacket which also has a desirably low coefficient of expansion together with substantial strength at high temperature. Formation of an intermediate layer is not essential to practice of the present invention.

The alloy which is employed in forming the barrel jacket is as indicated above an alloy of nickel, aluminum and molybdenum.

The alloy has constituents in proportions which are disclosed by U.S. Pat. No. 2,542,962 to Kinsey.

U.S. Pat. No. 3,617,397 discloses a cast nickel base superalloy containing 8% by weight aluminum and 18% by weight molybdenum and the remainder nickel.

U.S. Pat. Nos. 4,012,241 and 4,111,723 both disclose directionally solidified eutectic compositions of the nickel-aluminum-molybdenum system.

U.S. Pat. No. 3,975,219 describes a directional recrystallization for the alloys of the nickel-aluminum-molybdenum system. Australian Pat. No. 531066 describes a method of producing high strength aligned grain superalloy articles containing nickel, aluminum and molybdenum and other constituents. As is pointed out in the Australian patent "The basic ternary alloy has good short-term mechanical properties at elevated temperatures but suffers from microstructural instabilities which cause a marked deterioration in properties after long-term exposures at elevated temperatures. These instabilities include the formation of massive $\gamma'$ particles at the grain boundaries and the precipitation of Mo from the $\gamma$ phase. However, for certain applications the basic alloy may be adequate."

While there are a number of nickel, aluminum, molybdenum alloy compositions disclosed in these patent references the ones which are most suitable for use in the combination of the present invention are those which have a favorable combination of physical properties over a broad temperature range.

In this regard four alloys of nickel, aluminum, molybdenum were tested for physical properties over a broad temperature range. The alloys are listed in Table I by composition in both atomic percent and weight percent. Also the crystal type is indicated.

TABLE I

| Alloy | Crystal Type | a/o Ni | a/o Al | a/o Mo | w/o Ni | w/o Al | w/o Mo |
|---|---|---|---|---|---|---|---|
| 1 | $\gamma'(\alpha)$ | 70.5 | 19.5 | 10 | 73.6 | 9.4 | 17.0 |
| 2 | $\gamma' + \alpha$ | 65 | 18 | 17 | 64.3 | 8.2 | 27.5 |
| 3 | $\gamma/\gamma'(\alpha)$ | 70.7 | 14.2 | 15.1 | 69.4 | 6.4 | 24.2 |
| 4 | $\gamma/\gamma + \alpha$ | 65 | 13 | 22 | 60.8 | 5.6 | 33.6 |

The results of the tests of physical properties are listed in Table II for each of the four alloys.

TABLE II

| | Alloy (1) | | | Alloy (2) | | | Alloy (3) | | | Alloy (4) | | |
|---|---|---|---|---|---|---|---|---|---|---|---|---|
| Tensile Tests | YS(ksi) | UTS(ksi) | $\epsilon_F$(%) | YS | UTS | $\epsilon_F$ | YS | UTS | $\epsilon_F$ | YS | UTS | $\epsilon_F$ |
| Room T | 115 | 115 | 1 | — | 152 | 0.1 | 163 | 223 | 16 | — | 119 | — fillet failure |
| 1200 F. | 108 | 118 | 8 | 131 | 131 | 7 | 156 | 165 | 7 | 151 | 152 | 4 |
| 1400 F. | 83 | 89 | 5 | 85 | 90 | 7 | 118 | 124 | 4 | 102 | 111 | 4 |
| 1600 F. | 41 | 46 | 19 | 27 | 35 | 58 | 56 | 66 | 8 | 40 | 45 | 13 |
| 1800 F. | 13 | 15 | 87 | No test | | | 17 | 22 | 78 | 8 | 11 | 85 |
| 2000 F. | 3 | 3 | 73 | 2 | 2 | >100 | 2 | 3 | >100 | 2 | 2 | >100 |

The values of the yield strength in Table II may be compared to the values of yield strength of conventional barrel steel listed in Table III.

TABLE III

| Temperature | Yield Strength |
|---|---|
| Room temperature | ~130 ksi |
| 1200 F. | ~25 ksi |
| 1400 F. | ~10 ksi |

Another important property of a jacket metal for a barrel as provided by this invention is a good impact resistance. Charpy V-notch impact tests were performed on the four alloys and on barrel steel. The results are listed in Table IV.

TABLE IV

| | Charpy V-Notch Impact Test | | | | |
|---|---|---|---|---|---|
| | Alloy 1 | 2 | 3 | 4 | Barrel Steel |
| −40 F. | 0.5 ft. # | 0 | 3.2 | 3.2 | — |
| Room | 0.5 | 0 | 3.8 | 3.2 | ~10 |
| +1000 F. | 1.1 | 0 | 8.3 | 9.0 | — |

The results of this testing leads to the finding that on an overall basis the alloy identified in the tables as Alloy 3 has the best combination of properties. It is stronger than barrel steel.

Alloy 4 has a good set of properties which are slightly inferior to those of alloy 3 particularly in room temperature ductility.

The compositions of these alloys are plotted in the graph of FIG. 5. The compositions of nickel, aluminum and molybdenum deemed preferred for use in the combination of the present invention are included in the inner area designated II in the figure. The compositions of nickel aluminum and molybdenum which are deemed useful and operable in carrying out the method of the present invention are those compositions which fall within the composition ranges within the outer curve of FIG. 5 designated in the figure as curve I.

It is also preferred to include 0.1% by weight of boron in the nickel, aluminum and molybdenum alloy used in forming barrels pursuant to the present invention.

Figure 6:
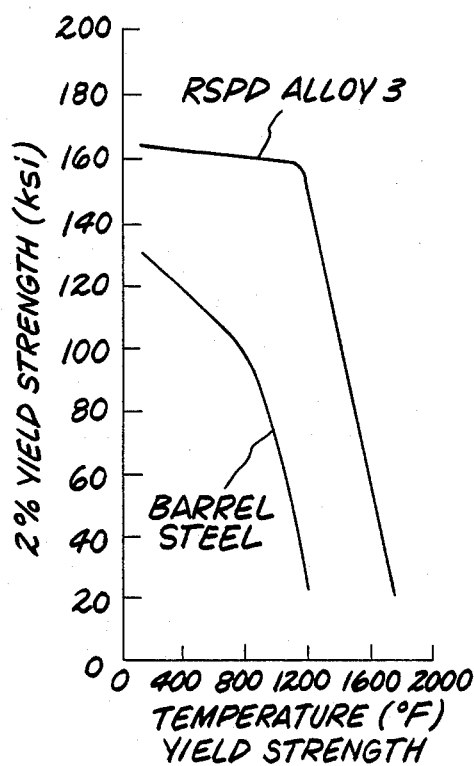
FIG. 6 is a comparative plot of the 0.2% yield strength in ksi over a temperature range for conventional barrel steel and for an alloy of nickel aluminum molybdenum.
Figure 7:
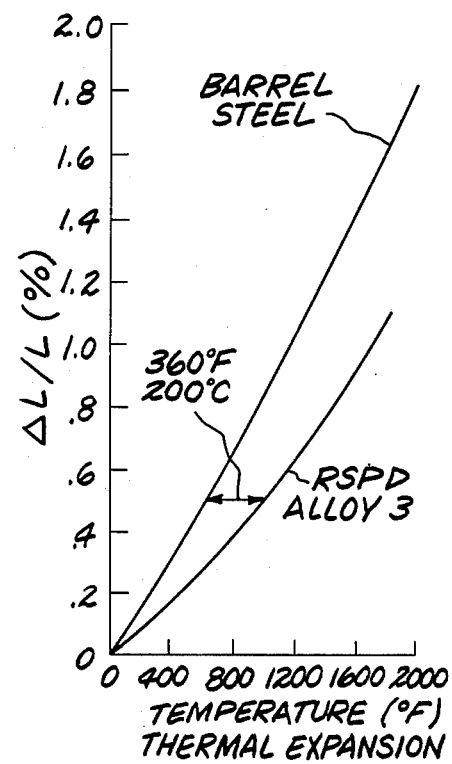
FIG. 7 is a plot of thermal expansion per unit of length over a temperature range for conventional barrel steel as compared to an alloy of nickel aluminum and molybdenum.

Some properties of the nickel, aluminum and molybdenum alloy relative to barrel steel are plotted in FIGS. 6 and 7 to illustrate some of the advantages of the combination of the present invention. In FIG. 6 0.2% yield strength is plotted as a function of temperature for barrel steel and for Alloy 3 of the tables. In FIG. 7 the thermal expansion is plotted as a function of temperature for Alloy 3 of the tables as well as for barrel steel.

An alloy of nickel, about 14 atomic percent aluminum, and about 15 atomic percent molybdenum is preferred in practice of the present invention.

We have recognized that the use of the nickel-aluminum-molybdenum system of alloys for gun barrel jackets is an application in which the desirable high strength at high temperature properties of the alloy system can perform well. For gun barrel use the actual time during which the barrel will be at the elevated operating temperatures which might cause the metallurgical effects described in the Australian patent is so short on a relative scale that we are able to obtain the advantages of the combination of properties of the metal without suffering the deteriorating effects of recrystallization.

A low pressure plasma deposition process results in rapid solidification plasma deposition of the deposited material. This case involves three different layers including the first inner liner layer of refractory metal, the second intermediate layer of combined refractory and jacket metal of nickel-aluminum-molybdenum and the third or outer layer of jacket material. Such depositions have typically resulted in a layer density which is greater than 97% of the theoretical density of the deposited material. Further, the level of contamination in the deposited material is quite low.

By the prior art it is known that plasma deposition of layers of material in an air atmosphere or in an inert gas atmosphere at atmospheric pressure does result in highly contaminated layers which typically display low density of the deposited material. Such highly contaminated low density deposits are virtually useless for applications involving gun barrels or similar applications.

It has been found that by the use of the low pressure plasma deposition process significant improvements can be made in gun barrels, in their construction, in their performance and in the cost at which such more effective and efficient barrels can be produced. These improvements may be achieved in part due to the use of low pressure rapid solidification plasma deposition to form composite barrels of multiple layers as explained in commonly owned U.S. Pat. No. 4,557,431 the attainment of a high density in and between the layers of deposited material of the order of 97% of theoretical density. It is also due in part to the attainment of such density at low contamination levels. The deposition of such high density layers makes possible the use of the resultant composite barrels to fire very high energy ammunition with very high velocity projectiles. The use of such composite multilayer barrels also makes possible the firing of long bursts of ammunition at high rates of fire.

The present invention makes use of the low pressure deposition, but combines this LPPD processing with the formation of a composite barrel structure having a refractory liner and a high performance at high temperature jacket to produce a novel gun product. As a first step of the process an inner refractory layer or liner is formed on a suitable mandrel.

The mandrel on which a gun barrel may be formed pursuant to the present invention is illustrated in FIG. 1. The mandrel has external rifling ribs 10 formed on its outer surface 12 so that a barrel liner which is formed on the mandrel will have conforming internal rifling grooves.

After formation of the complete barrel on the mandrel the mandrel is removed by dissolving it chemically or by other conventional means.

The mandrel may also include a larger end 14 over which the chamber of the barrel is formed. The chamber and the rifled portion are sized so that a subsequent densification by heating will yield barrels with correct final dimensions. One way to achieve such final dimensions is by employing the process described in commonly owned U.S. Pat. No. 4,537,742. This patent is incorporated herein by reference.

Because the rifling ribs are formed on the exterior of the mandrel and such formation is relatively simple in terms of mechanical working the configuration of the ribs can be given any desired curves and one form of rib which is particularly preferred is the rib with the accelerated pitch illustrated in FIG. 1. In other words as the projectile first makes contact with the rifling the rifling is aligned with the axis of the bore of the barrel. Then as the projectile moves along the length of the barrel the pitch of the rifling may be altered to give the projectile a component of torque and to increase the angular acceleration of the projectile itself.

In FIG. 1 a mandrel is shown having a surface of ribbing adapted to provide one form of rifling which results in accelerated rotation, or gain twist, of a projectile in a gun barrel formed on the mandrel. For this mandrel the first ribbing 16 beyond chamber 14 is axially aligned so that no torque is applied as a projectile contacts complementary axially aligned rifling in a barrel. The pitch of the ribs on the mandrel relative to the barrel axis, and the pitch of the resultant pitch of rifling in a barrel formed on the mandrel is increased as illustrated at 18 further down the barrel from the chamber 14. By inducing the gain twist further down the barrel from the chamber the stress due to the twist is separated or spread out from that produced at the chamber. This can benefit the overall operation of the gun in which the barrel is used. After undergoing the change in pitch the pitch relative to the axis of the barrel is held constant as at 20 and for the remainder of the length of the barrel.

The deposition of a refractory metal onto the mandrel as illustrated in FIG. 2 to form an inner liner for a gun barrel is carried out through the use of vacuum plasma deposition techniques as taught in U.S. Pat. Nos. 3,839,618 and 4,418,124. The thickness of the liner is carefully designed to minimize the use of more expensive and critical materials. To optimize the use of such expensive liner materials, a plasma gun, which delivers the plasma is moved relative to the workpiece so that the coating on the mandrel is formed with a significant measure of radial uniformity around the barrel. The deposit is preferably varied in thickness to place higher or greater thickness of the liner material at the portions of the barrel where the greatest wear and greatest heating occur.

Accordingly a thicker layer is formed at the exit of the chamber and also at the start of the rifling. Also a greater thickness is preferably formed at the muzzle of the bore as there is a tendency for a flattening of the rifling lands at this end as the projectile exits from the muzzle end.

Following the completion of the deposit of the liner material 22 as illustrated in FIG. 2 an intermediate layer may be formed over the liner to provide a transition in properties between the properties of the liner and those of the jacket metal which forms the major bulk of the barrel. The intermediate layer may be formed by mixing the powder used in forming the liner with the powder of the jacket metal.

Also preferably the liner is formed as illustrated in FIG. 2 and the intermediate layer is formed on top of the liner as illustrated in FIG. 3 with no interruption in the forming process. This permits good bonding to be achieved between these layers. This also permits the productivity to be maintained at an elevated level. Further it permits maintenance of the barrel temperature at a level preferred for the deposit of the molten metal particles from the plasma and permits a very strong integral bond approaching theoretical strength to be formed between the outer surface of the liner and the intermediate layer.

Because the thermal coefficient of expansion of the outer jacket metal of an alloy of nickel, aluminum and molybdenum is low and is close to that of refractory type materials the need for an intermediate layer in order to maintain a good bond between the plasma deposited liner and the plasma deposited jacket material is not as great as it is in those cases in which the respective coefficients of expansion have greater differences. In the case of the gun barrel as described in U.S. Pat.

No. 4,577,431, the intermediate layer which intimately combines the two materials which form the barrel and which have significantly different thermal coefficients of expansion is more important to the structure of the barrel. Pursuant to the present invention a novel barrel may be formed with a refractory liner and an outer barrel and without an intermediate layer.

Because most refractory materials, including the refractory metals such as tungsten, tantalum and also the refractory ceramic like compounds of the refractory metals such as tungsten carbide, tantalum carbide and the like have relatively low thermal coefficients of expansion and because the thermal coefficient of the barrel jacket material of nickel, aluminum and molybdenum is also low the need for an intermediate layer is relatively low and the deposit of a substantial layer as represented by the layer 31 of FIG. 3 is relatively low and may be omitted. However, an intermediate layer may be included because its formation by the low pressure plasma deposition process is very simple and convenient and requires only a mixing of liner and jacket powders supplied to the plasma gun after the liner has already been formed. In any case, the low pressure plasma deposition method permits a good metallurgical bond to be formed directly between a refractory liner and a nickel-aluminum-molybdenum jacket. In FIG. 3 a partial section of the structure of the base of the barrel is illustrated. In FIG. 3 the innermost sectioned layer is the section of the mandrel of FIG. 1. The sectioned layer 28 is a sectioned view of the liner layer deposited as described above in forming the liner layer of FIG. 2. The outer layer 31 is the intermediate layer which, as described immediately above, may be minimized or omitted as in the subject invention where a combination of materials is incorporated into a gun barrel which have a unique set of physical properties for use in combination in a gun barrel and which also have relatively close thermal coefficients of expansion.

After the liner has been formed by low pressure plasma deposition the outer jacket of an alloy of nickel, aluminum and molybdenum having a relatively low coefficient of expansion is formed as the bulk of the structural portion of the barrel. The alloys used in the low pressure plasma deposition of the barrel jacket on the liner as illustrated in FIG. 4 are the alloys of nickel, aluminum and molybdenum disclosed and discussed above.

Following the formation of the liner and any intermediate layer as illustrated in FIG. 3 the outer layer of barrel metal is deposited in successive passes along the barrel to construct the composite barrel as semi-schematically illustrated in FIG. 4. The drawing of FIGS. 3 and 4 is referred to as semi-schematic because the dimensions of the liner and any intermediate layer as well as the jacket layer are shown out of proportion in order to make clear the composite nature of the combined liner and jacket layer and also to illustrate by the drawing what cannot be seen clearly in the article.

The finished barrel article is illustrated in vertical axial section in FIG. 4 and provides a novel gun barrel which has a number of advantages as follows.

First it is effective in maintaining to a minimum the friction in the chamber so that the rounds and cartridges can be introduced and withdrawn to and from the chamber rapidly.

Secondly the refractory metal liner prevents the melting of the bore surface in the breech end and elsewhere along the barrel. This location is where the highest temperature is developed as the propellant burns in the cartridge and is expelled from the cartridge opening 32 into the breech end 30 of the barrel liner as illustrated in FIG. 4. The enlarged breech 34 is not excessively heated but is subjected to high forces requiring a high modulus of elasticity as the propellant gases in the cartridge expands.

Because of a good metallurgical bond between the liner and the jacket of barrel metal, a very high level of heat transfer is achieved through this layer and from the layer to minimize the accumulation of heat at the bore surface. However, because the bore surface is a refractory material, including a metal such as tantalum, tungsten, molybdenum, or the like, metal or ceramics such as carbides, oxides or similar compounds of refractory or other metals, such refractory surface can withstand heating and thermal shock at very elevated temperatures without incipient melting. Because the metal of the liner is at the higher temperatures which can be tolerated by refractory materials there is a much higher thermal driving force driving the heat from the liner surface through the barrel metal to the barrel exterior. The outer barrel surface is of the alloy of nickel, aluminum and molybdenum and can be at a higher temperature, substantially above the temperature to which conventional low alloy steel barrels can be heated without impairment of physical properties. Because such alloy can release more heat to its environment than the conventional barrels without causing damage, its operation as a gun barrel is more efficient. Consequently the composite gun barrel of this invention can sustain higher flame temperatures and meet the requirements of structural integrity of a high performance gun barrel.

Further the construction of this composite barrel prevents the wear of the barrel further down particularly as the metal of the rifling starts to apply force and rotary motion to the projectile as it advances through the bore. This composite construction has the effect of lessening the wear. Further because of the very effective control of the rifling in the bore and at the muzzle and the ability to tailor the rifling so that it undergoes a change in pitch along the length, the development of high wear at the portion of the bore where the rifling starts is reduced. Also the incorporation of the refractory metals into the composite structure improves the barrel inasmuch as they retain their physical properties at higher temperatures and this resistance to high temperature wear further influences a reduction in the wear at this portion of the bore.

A further advantage is in lessening and preventing the flattening of the rifling particularly in the area proximate the chamber and muzzle. Special tailoring of the pitch of the rifling proximate the bore as in forming the mandrel of FIG. 1 or the liner layer of FIG. 2 is similarly feasible. As noted above there is a greater tendency for the rifling to wear at the chamber end of the barrel and at the muzzle end. The use of the liner of this invention with the refractory metal and with the extremely good metallurgical bond between the refractory metal and the solid metal jacket, provides a greater resistance on the part of these components to wear. A key advantage of this invention is to provide a combination of a highly wear resistant material bonded to a high strength metal jacket to yield a gun capable of operating efficiently at more elevated temperatures.

The materials which are used for fabrication of the liner of the present invention are high melting temperature materials and these can include the following: tantalum alloys, such as, Ta-10 W (Ta-10 w/o W) or T-111 (Ta-8 W-2Hf); columbium base alloys (C-129Y); chromium, tungsten base, molybdenum base alloys (TZM); and the platinum group alloys. The materials also include the non-metal refractory materials such as carbides, oxides, borides as well as cermets and combinations of metals and non-metal refractories.

In addition to the use of conventional methods of hardening the refractory metals by various thermo-mechanical alloying and related techniques, the present method permits the addition of compounds such as carbides, oxides and borides which can be included in the powder from which the various layers of the product of the present invention can be formed. Alternately, the very inner surface of the liner may be entirely oxide, carbide or boride, grading to a refractory metal.

The mandrel onto which the refractory liner is plasma deposited can be smooth for those barrels which fire fin stabilized projectiles.

A smooth bore barrel can be formed for later machining to form internal rifling. However some of the advantages of the present invention are lost if the thin layer of the refractory metal is first formed on the interior of the barrel and this surface is then machined at a later date after the mandrel has been removed.

Conventional machining involves broaching, rotary forging or electrochemical machining and would destroy the protective inner refractory liner.

However, these steps are eliminated where the mandrel itself bears the form of the rifling to be imparted to the bore so that the bore doesn't have to be machined at a later time. The gun barrels of this invention are made without internal machining although the external surface may be machined to final dimensions.

An interface layer between the refractory liner and the nickel, aluminum, molybdenum jacket metal is not essential to practice of the present invention. However such an intermediate layer may be incorporated in the barrel structure.

Where it is employed, the interface layer between the liner and the jacket is preferably made to have a gradual transition in properties between those of the refractory material of the liner and those of the metal alloy of the jacket. Such an intermediate layer can help to ensure a sound metallurgical bond in any case between the layers. The gradual transition in properties is generally not important in making the backup properties of the outer jacket available to the liner of the barrel particularly where the respective coefficients of expansion are quite close.

The external jacket of the gun barrel which provides the needed strength and rigidity for the barrel is also vacuum plasma formed. The jacket can be plasma sprayed to near net shape and to include deposits of metal for various clamps and mounting mechanism by controlling the number of plasma spray passes. This control can be exercised by developing a program for the relative movement of the plasma gun and the mandrel as the barrel layers are formed and deposited on the mandrel.

A black corrosion protection coating can be applied over the jacket for barrels which do not require external machining as for example where there are clamping surfaces which must be formed with close tolerances. The black surface assists in heat radiation to improve barrel cooling and also to provide limited corrosion protection.

Where the metal is formed with voids due to the vacuum plasma spraying the voids can be reduced or eliminated by secondary treatments of the barrel. One such treatment involves heating the barrel to an elevated temperature for a time which consolidates the metal of the barrel. Alternatively hot gas isostatic pressing may be employed. Further for some barrels hot forging may be used to consolidate the barrel following its spray formation.

After the barrel has been consolidated the mandrel is mechanically removed or dissolved chemically to leave a finished inner refractory surface to be used as the inner surface of the barrel liner.

A heat treatment to provide desirable mechanical properties may be applied to the liner and to the jacket following the removal of the mandrel. Such heat treatment can impart movements to the combined barrel structure and enhance its properties.

One advantage of the present invention is that the composite structure may be formed using only two distinct powders to be fed to the plasma gun. One powder is the refractory metal powder and the other is the jacket metal powder. Further the barrel may be formed in one continuous plasma spray session starting with the refractory metal, to deposit the liner over the length of the mandrel, then by switching to a powder mix of refractory and jacket metal powders to form the intermediate layer if one is desired, and by then switching to a powder entirely made up of jacket material.

A higher thickness of liner metal may be deposited around the chamber end of the mandrel or around the portion of the mandrel where the greater stress is to be developed based on the design of the barrel and the use to be made of it.

A greater liner thickness may be formed at the section of the barrel where the projectile first meets the rifling if the rifling design is one which develops great stress in this section.

Abrasion and wear down of rifling at the muzzle can be lessened by increasing the liner thickness at this section of the barrel.

Where close tolerances of the internal dimensions of the barrel are desired they may be achieved with the aid of the process taught in commonly assigned U.S. Pat. No. 4,537,742. The text of this patent is incorporated herein by reference but is not essential to the practice of the present invention.

Suitably the inner liner may have a thickness of between five and twenty mils, the intermediate layer if one is employed may have a thickness of one to twenty mils and the jacket may have a thickness ranging from about three-eighth to about three-quarters of an inch for use with small or medium calibre ammunition.

What is claimed is:

1. A gun having a barrel lined with a plamsa deposited refractory material, and having a structural body of an alloy of nickel, aluminum and molybdenum bonded plasma deposited and bonded to the outer surface of the refractory liner and providing a supporting jacket of the barrel, said alloy containing a quantity of aluminum and molybdenum corresponding to a value falling within curve I of FIG. 5, the balance being nickel, and said alloy having a 0.2% yield strength in excess of 140 ksi at temperatures up to 1200° F.

2. The gun of claim 1 in which the refractory material is a refractory metal.

3. The gun of claim 1 in which the refractory material is at least one refractory metal selected from the group consisting of tungsten, tantalum and molybdenum.

4. The gun of claim 1 in which the refractory material is composed of a boride of a refractory metal.

5. The gun of claim 1 in which the refractory material is a carbide of a refractory metal.

6. The gun of claim 1 in which the refractory material is a refractory oxide.

7. The gun of claim 1 in which the refractory material is a tantalum alloy containing 10 weight percent tungsten.

8. The gun of claim 1 in which the refractory material is a tantalum alloy containin 8 weight percent tungsten and two weight percent hafnium.

9. The gun of claim 1 in which the liner is of a columbium base alloy C-129Y.

10. The gun of claim 1 in which the liner is of a molybdenum base alloy containing titanium, zirconium and molybdenum.

11. The gun of claim 1 in which the liner is of at least one refractory compound selected from the group consisting of carbides, oxides and borides.

12. The gun of claim 1 in which the structural body is of an alloy containing a quantity of aluminum and molybdenum corresponding to a value falling within curve II of FIG. 5 and the balance of nickel.

13. The gun of claim 1 in which the structural body is an alloy of nickel containing 6.4 weight percent aluminum and 24.2 weight percent molybdenum.

14. The method of forming a gun barrel having a rifled bore and capable of high rates of fire at high energy which comprises, providing a mandrel conforming to the bore of the barrel, low pressure plasma depositing on said mandrel a liner of refractory material, low pressure plasma depositing on said refractory liner a barrel jacket of an alloy of nickel, aluminum and molybdenum, said alloy having a composition falling within the area enclosed by curve I of FIG. 5, and said alloy having a 0.2% yield strength in excess of 140 ksi at temperatures up to 1200° F.

* * * * *